3,339,024

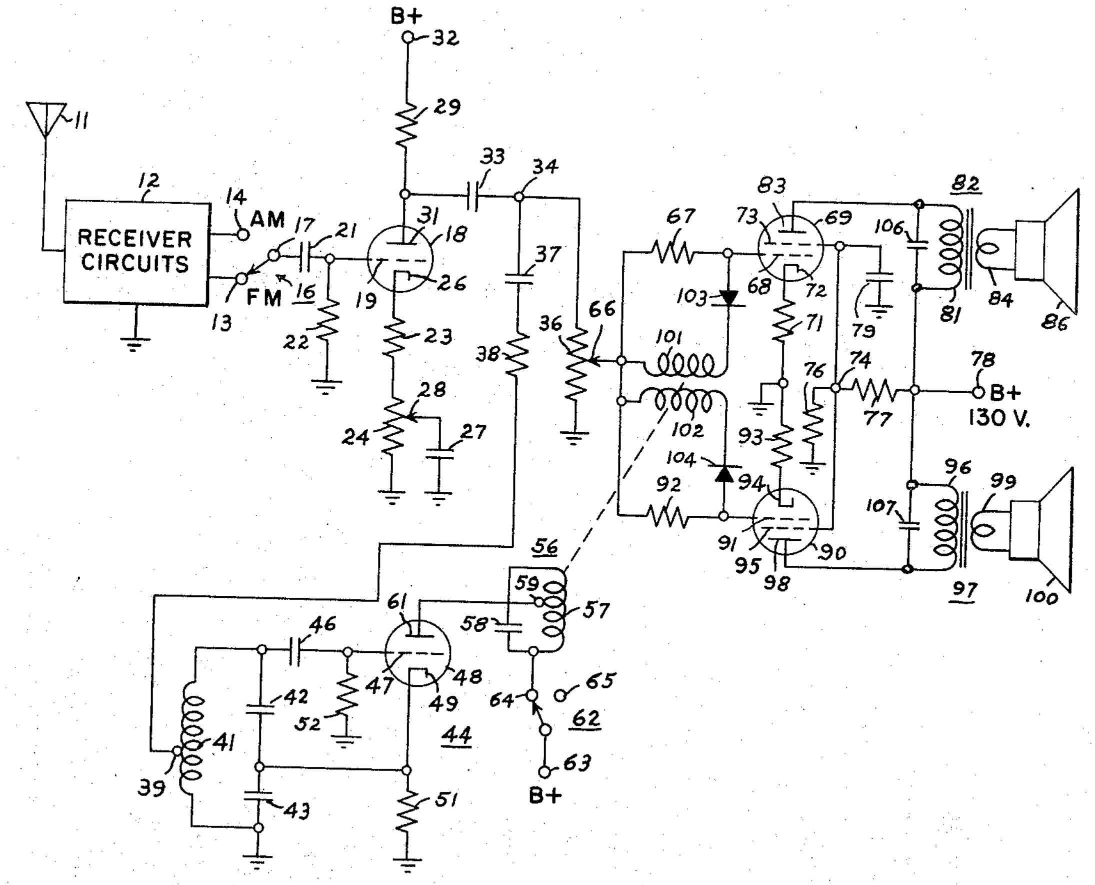
INVENTOR:
ANTAL CSICSATKA,
BY Norman C. Fulmer
HIS ATTORNEY.

TIME SAMPLING STEREOPHONIC RECEIVER CIRCUIT

Antal Csicsatka, Utica, N.Y., assignor to General Electric Company, a corporation of New York
Filed June 1, 1965, Ser. No. 460,118
2 Claims. (Cl. 179—15)

ABSTRACT OF THE DISCLOSURE

A time sampling stereophonic receiver employing in each channel an electron discharge device having a control grid to which the composite signal is applied, each discharge device being biased in the normally amplifying condition and a negative switching signal being applied to the control grid thereof via a serially connected diode to alternately cut-off the respective discharge devices.

This invention relates to stereophonic radio reception, and particularly to receiver circuits for deriving "left" and "right" stereo signals from a "composite" stereo signal by means of time-sampling techniques.

In the standardized FM stereo broadcasting system, the broadcast signal is a carrier wave frequency-modulated by a "composite" signal having a frequency spectrum in the form of a sum of the "left" and "right" stereo signals, i.e. $L+R$; sidebands of a difference combination of the "left" and "right" signals, i.e. $L-R$, referenced to a suppressed subcarrier or reference wave of 38 kc. per second; and a "pilot" signal at 19 kc. per second lying in a frequency gap between the $L+R$ component and the $L-R$ sidebands component.

One type of reciver for such a signal employs time-sampling techniques. The composite signal is alternately sampled, by means of diodes or amplifier devices, at a rate corresponding to the 38 kc. sideband reference wave. This sampling is achieved or controlled by a 38 kc. switching signal which is properly phased with respect to the suppressed reference wave so that the sampling process derives an "L" audio signal at the left signal channel output, and an "R" audio signal at the right signal channel output. These L and R signals are then amplified, if required, and fed to separate loudspeakers. Volume controls and balance controls are provided in the two audio channels to provide desired volume and balance of the reproduced stereo signals. One problem with such time-sampling circuits is that audio-frequency noise components which inherently exist in the switching signal will appear as undesired noise components in the L and R reproduced stereo signals, unless special precautions are taken to reduce them. One way to reduce this unwanted noise is to employ bridge-type time sampling circuits for cancelling the switching signal and its noise components; however this expedient is costly because it requires additional circuit components.

An object of the invention is to provide an improved stereophonic receiver circuit.

Another object is to provide an improved stereophonic receiver circuit which is both reliable in performance and low in cost.

A further object is to provide an improved stereophonic receiver circuit which automatically functions for both monaural and stereophonic signal reception.

An additional object is to provide an improved time-sampling stereophonic receiver circuit which is immune to undesirable effects from noise components in the switching signal.

Still other objects will be apparent from the following description and claims, and from the accompanying drawing.

The improved stereophonic receiver circuit of the invention comprises, briefly and in a preferred embodiment, a pair of amplifier devices, means rendering said amplifier devices normally operable for amplifying signals, means to apply a stereophonic composite signal to the input electrode of these amplifier devices, and means to alternately render the amplifier devices inoperable at the frequency rate of the reference wave of the composite signal, whereby the "left" and "right" stereo signals are derived at the respective output electrodes of the amplified devices. Further in accordance with the invention, the amplifier devices are rendered alternately inoperable by applying a switching signal to their respective input electrode in relatively opposite phase, a pair of diodes being respectively connected between the input electrodes and the switching signal source with polarity orientations to cause the amplifier devices to be switched only into the "off" condition by the switching signal.

In the drawing, the single figure is a schematic electrical diagram of a circuit in accordance with a preferred embodiment of the invention.

An antenna 11 picks up the FM stereo signal in conventional manner, and applies it to receiver circuits 12 which normally include, for reception of FM signals, a mixer circuit, intermediate frequency amplifier stages, and a demodulator of the limiter-discriminator type or ratio-detector type. The output of the receiver circuits 12 at the FM output terminal 13, when FM stereo is received, comprises the composite signal in the form of an $L+R$ component in a range of some 50 to 15,000 cycles per second, a pilot signal at 19 kc. per second, and $L-R$ sidebands of a suppressed amplitude modulated subcarrier, these sidebands extending between 23 kc. per second and 53 kc. per second. The receiver circuits 12 also may comprise conventional AM circuitry which may include a mixer circuit, an intermediate frequency amplifier circuit, and an AM detector, the output of which provides the demodulated monaural audio signal at the AM output terminal 14. If desired, some of the AM and FM circuitry in the receiver circuits 12 may constitute dual-functioning circuitry.

A switch 16 alternatively connects a terminal 17 to the FM output terminal 13 and the AM output terminal 14. An amplifier device 18 which is shown as comprising a vacuum tube, has a grid input electrode 19 connected via a coupling capacitor 21 to the terminal 17. A resistor 22 is connected between the grid 19 and electrical ground. A resistor 23 and a potentiometer 24 are connected in series between the cathode 26 of tube 18 and electrical ground, as shown, and a capacitor 27 is connected between an adjustable tap 28 of the potentiometer 24 and electrical ground. This latter circuitry is described and claimed in patent application Ser. No. 269,374, filed Apr. 1, 1963, now Patent No. 3,258,540, and assigned to the same assignee as the present invention. A load resistor 29 is connected between the anode 31 of tube 18 and a terminal 32 of a source of operating voltage for the tube 18.

A coupling capacitor 33 is connected between the anode 31 and a terminal 34. A volume control potentiometer 36 is connected between the terminal 34 and electrical ground. A capacitor 37 and resistor 38 are connected in series between the terminal 34 and a tap 39 of an inductance 41. A pair of capacitors 42 and 43 are connected in series across the inductance 41, and in combination therewith provide a filter tuned to the pilot signal frequency of 19 kc., this filter being part of an oscillator circuit which functions as a switching signal generator designated generally by the numeral 44. The lower end of inductance 41 is grounded, and the upper end is coupled via a capacitor 46 to the grid 47 of an oscillator tube 48, the cathode 49 of this tube being connected to the junction of capacitors 42 and 43, and also being connected to electrical ground via a resistor 51. A resistor 52 is connected between the grid 47 and electrical ground. An oscillator output circuit 56, comprising an inductance 57 connected in parallel with a capacitor 58, is tuned to the 38 kc. switching signal, and a tap 59 of the inductance 57 is connected to the anode 61 of the oscillator tube 48. A switch 62 is arranged to connect oscillator operating voltage from a voltage terminal 63 to the end of the inductance 57 for reception of FM stereo signals, and to disconnect this operating voltage for reception of AM and FM monaural signals. The switching signal generator 44 oscillates due to the connection of the cathode 49 to the junction of the capacitors 42 and 43 thereby providing an oscillatory feedback arrangement, and a 38 kc. switching signal is produced in the output resonant circuit 56 in synchronism with or under control of the 19 kc. pilot signal that is filtered out and selected from the composite signal by the pilot filter comprising inductance 41 and capacitors 42 and 43.

The adjustable tap 66 of the volume control potentiometer 36 is connected via a resistor 67 to the control electrode 68 of an amplifier or other signal-passing device 69 in the "A" channel. As shown in this embodiment, the amplifier device 69 may comprise a screen-grid type of tube having an input electrode 68 in the form of a control grid. A bias resistor 71 is connected between the cathode 72 and electrical ground, and has a resistance value suitable for biasing the tube 69 for normal amplifier functioning. A screen grid 73 of the tube 69 is connected to a junction 74 of a pair of voltage-dropping resistors 76 and 77 connected between a terminal 78 of operating voltage and electrical ground. A capacitor 79 is connected between the screen grid 73 and electrical ground. A primary winding 81 of an audio output transformer 82 is connected between the anode 83 of tube 69 and the operating voltage terminal 78. A secondary winding 84 of the transformer 82 is connected to a loudspeaker 86.

A "channel B" amplifier or other signal-passing device 90, which may be a vacuum tube, has a control grid or electrode 91 connected via a resistor 92 to the volume control tap 66. A biasing resistor 93 is connected between the cathode 94 and electrical ground, and has a value similar to that of bias resistor 71, for biasing the amplifier tube 90 for normal Class A amplification functioning. A screen grid 95 of tube 90 is connected to the junction point 74 in order to obtain proper voltage, and a primary winding 96 of a channel B output transformer 97 is connected between the anode 98 of tube 90 and the operating voltage terminal 78. A secondary winding 99 of transformer 97 is connected to a channel B loudspeaker 100.

A pair of switching signal secondary windings 101 and 102 are inductively coupled to the inductance 57 of the 38 kc. oscillator output circuit and each has an end thereof connected to the adjustable volume control tap 66. In effect, these windings 101 and 102 constitute a single center-tapped winding having two halves 101 and 102. The remaining end of winding 101 is connected via a diode 103 to the input electrode 68 of channel A amplifier device 69, and the remaining end of the winding 102 is connected via a diode 104 to the input electrode of the channel B amplifier device 90. The diodes 103 and 104 are oriented in the circuit with respect to polarity, so that the switching signal from the secondary windings 101 and 102 will alternately switch the devices 69 and 90 off, but will not affect the "on" or amplification condition of these devices. In the example shown, using vacuum tubes, therefore, these diodes 103 and 104 are oriented in the circuitry so that negative-polarity half-cycles of the switching signal will pass through the diodes to the control electrodes 68 and 91 for alternately rendering these amplifier devices inoperative, whereas during positive polarity of the switching signal half-cycles at the diode-connected ends of the windings 101 and 102, the diodes 103 and 104 are non-conductive and block positive-polarity switching signal half-cycles from the input electrodes 68 and 91 of the channel A and channel B amplifier devices.

The circuit functions as follows for the reception of AM, FM monaural, and FM stereo signals.

To receive AM signals, the switch 16 connects the terminals 14 and 17 together, so that the demodulated AM audio signal is applied to the input electrode 19 of the amplifier tube 18, and the switch 62 is positioned to the "off" terminal 65, thereby rendering the switching signal generator 44 inoperative. The AM audio signal is amplified by the amplifier device 18, and is applied to the volume control 36, from the tap 66 of which it is applied respectively to the input electrodes 68 and 91 of the amplifier devices 69 and 90 via the resistors 67 and 92 which have appreciably no effect on the audio signal. The audio signal is amplified by the devices 69 and 90 and applied to both of the loudspeakers 86 and 100, whereupon the monaural AM audio signal is reproduced by both speakers 86 and 100.

For receiving FM monaural signals, the switch 16 is positioned to connect the terminal 17 to the FM receiver circuit output terminal 13, and the switching signal generator switch is positioned to the inoperative terminal 65 for rendering the switching signal generator 44 inoperative. The monaural FM audio signal is then amplified by the amplifier device 18, and by the amplifier devices 69 and 90 and applied to both of the loudspeakers 86 and 100, in the same maner as for an AM monaural signal.

For receiving FM stereo, the switch 16 is positioned to connect the terminal 17 to the FM terminal 13, and the switching signal generator switch 62 is positioned to the "on" terminal 64 thereby causing the switching signal generator 44 to produce, under control of the 19 kc. pilot signal, a 38 kc. switching signal at the resonant circuit 57–58, and hence at the secondary windings 101 and 102. Due to the above-described orientation of the diodes 103 and 104 in the circuit, alternate half-cycles of the switching signal will render the channel A and channel B amplifier devices 69 and 90 alternately non-conductive, in proper phase so that when the channel B amplifier 90 is non-conductive, the channel A amplifier 69 will be in its normally conductive or amplifying condition, so as to sample an appropriate half-cycle of the composite signal, for example the "left" information half-cycle of the reference wave, whereupon the left sereo audio signal will be fed to the channel A reproducer 86. Similarly, during the switching signal half-cycles when the amplifier 69 is rendered non-conductive, the channel B amplifier device 90 will be in its normally "on" or amplifying condition, and will sample or pass the "right" stereo information to the reproducer 100. As is well known, sampling of the composite stereo signal during successive half-cycles of the suppressed reference wave will produce the left and right stereo audio information. The devices 69 and 90 function both as switching or time-sampling devices and as amplifiers. The above-described network of resistor 24 and capacitor 27 increases the relative amplitude of the L—R sidebands in the composite signal, so as to reduce the amount of cross-talk in the L and R stereo output signals—i.e. so as to reduce a small amount of undesired R that tends to occur in the L output signal and to reduce a small amount of undesired L that tends to occur in the R output signal.

The invention achieves, in a simple and inexpensive circuit, automatic reception of both monaural and stereophonic signals, due to the fact that the amplifier devices 69 and 90 are biased (by means of the biasing resistors 71 and 93) for normal amplification functioning, whereby they automatically amplify monoaural signals, and also time-sample and amplify stereophonic signals automatically when the switching signal generator 44 generates a switching signal during reception of stereophonic signals.

In accordance with another important feature of the invention, audio noise components which inherently are present along with the switching signal, are not reproduced by the loudspeakers 86 and 100, because of the fact that during the time periods that the amplifier devices 69 and 90 are in amplifying condition for the stereo signals, the switching signal is not applied thereto, and conversely whenever the switching signal and its noise components are applied to an input electrode of an amplifier device, that amplifier device during that time is in the "off" condition. This feature is achieved by the connection of the diodes 103 and 104 in the circuit, in conjunction with the normally operative biasing of the switching and amplifying devices 69 and 90, as has been described. A further important feature of the invention is non-criticalness of the amplitude and wave shape of the switching signal, the only requirements for the switching signal being that it be of sufficient amplitude to alternately render the amplifier devices 69 and 90 in the "off" condition, and in proper phase with respect to the suppressed reference wave so that the left and right stereo signals will be suitably produced by the switching action of the circuit. Capacitors 106 and 107 are respectively connected across the audio output transformer primary windings 81 and 96, and have small values of capacitance to integrate the pulses of stereo signal information.

While a preferred embodiment of the invention has been shown and described, various other embodiments and modifications thereof will be apparent to those skilled in the art and will fall within the scope of invention as defined in the following claims.

What I claim is:

1. A circuit for deriving stereo signals from a composite signal including as frequency components thereof a sum combination of the stereo signals and a difference combination of the stereo signals in the form of sidebands of a suppressed reference wave of given frequency, said circuit comprising A and B channel amplifier devices each having an input electrode and an output electrode, means normally biasing each of said amplifier devices in amplifying condition, a terminal for application thereto of said composite signal, a first resistor connected between said terminal and the input electrode of the A channel amplifier device, a second resistor connected between said terminal and the input electrode of the B channel amplifier device, switching signal generator means for providing a switching signal at said given frequency, first and second diodes, and means connecting said first and second diodes in first and second series circuits with said switching signal generator respectively between said input electrodes of the amplifier devices and a signal reference point, said diodes and switching signal being oriented with respect to polarity so as to cause said amplifier devices to alternately be rendered in non-amplifying conditions during successive half-cycles of the switching signal thereby deriving said stereo signals respectively at said output electrodes of the A channel and B channel amplifier devices.

2. A circuit as claimed in claim 1, in which said signal reference point is said terminal whereby said first and second series circuits are respectively connected in parallel with said first and second resistors.

References Cited

UNITED STATES PATENTS

| | | | |
|---|---|---|---|
| 3,151,216 | 9/1964 | Creamer et al. | 179—15 |
| 3,176,074 | 3/1965 | Browne | 179—15 |
| 3,225,143 | 12/1965 | Parker | 179—15 |

OTHER REFERENCES

Browne, "New Stereophonic Broadcasting System," British Communications and Electronics, March 1960, pages 204 and 205, relied on.

JOHN W. CALDWELL, *Acting Primary Examiner.*

ROBERT L. GRIFFIN, *Examiner.*